United States Patent
Thomas et al.

(10) Patent No.: US 7,392,100 B1
(45) Date of Patent: Jun. 24, 2008

(54) SYSTEM AND METHODOLOGY THAT FACILITATE FACTORY AUTOMATION SERVICES IN A DISTRIBUTED INDUSTRIAL AUTOMATION ENVIRONMENT

(75) Inventors: David Ellis Thomas, Germantown, WI (US); Taryl Jon Jasper, South Euclid, OH (US); Clifton Harold Bromley, New Westminster (CA); Neville J. Parakh, Delta (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 10/219,099

(22) Filed: Aug. 15, 2002

(51) Int. Cl.
*G05B 15/00* (2006.01)

(52) U.S. Cl. .................. 700/83; 700/80; 717/101; 707/10; 707/100

(58) Field of Classification Search ............ 700/80, 700/83, 103, 108, 109, 110, 96; 717/101, 717/108, 120, 165; 707/100, 10
See application file for complete search history.

(56) References Cited

U.S. PATENT DOCUMENTS

| | | | | |
|---|---|---|---|---|
| 5,768,119 A | * | 6/1998 | Havekost et al. ............ 700/83 |
| 5,878,260 A | * | 3/1999 | Copeland et al. ............ 717/108 |
| 6,115,715 A | * | 9/2000 | Traversat et al. ............ 707/100 |
| 6,192,281 B1 | * | 2/2001 | Brown et al. ................. 700/83 |
| 6,201,996 B1 | * | 3/2001 | Crater et al. ................. 700/96 |
| 6,421,571 B1 | * | 7/2002 | Spriggs et al. ............... 700/83 |
| 6,571,140 B1 | * | 5/2003 | Wewalaarachchi et al. ... 700/83 |
| 2003/0009250 A1 | * | 1/2003 | Resnick et al. ................ 700/94 |
| 2003/0126136 A1 | * | 7/2003 | Omoigui ..................... 707/10 |

* cited by examiner

*Primary Examiner*—Leo Picard
*Assistant Examiner*—Charles Kasenge
(74) *Attorney, Agent, or Firm*—Amin & Turocy, LLP; William R. Walbrun

(57) ABSTRACT

The present invention relates to a system and methodology providing automation services in a distributed industrial controller environment. In one aspect of the present invention, a data access service is provided that includes, sending and receiving data to and from a data access service namespace operative in the distributed controller environment. In another aspect of the present invention, an alarming service is provided wherein data values are monitored in a server component according to predetermined conditions configured by a user or other entity. If the data values are determined to be outside of boundaries as defined by the predetermined conditions, an alarm can be communicated to a plurality of other components cooperating in the distributed environment.

34 Claims, 16 Drawing Sheets

SYSTEM AND METHODOLOGY THAT FACILITATE FACTORY AUTOMATION SERVICES IN A DISTRIBUTED INDUSTRIAL AUTOMATION ENVIRONMENT

TECHNICAL FIELD

The present invention relates generally to industrial control systems, and more particularly to a system and methodology to provide data access and alarm services in a distributed industrial automation environment.

BACKGROUND OF THE INVENTION

Industrial control systems have enabled modern factories to become partially or completely automated in many circumstances. These systems generally include a plurality of Input and Output (I/O) modules that interface at a device level to switches, contactors, relays and solenoids along with analog control to provide more complex functions such as Proportional, Integral and Derivative (PID) control. Communications have also been integrated within the systems, whereby many industrial controllers can communicate via network technologies such as Ethernet, Control Net, Device Net or other network protocols and also communicate to higher level computing systems. Generally, industrial controllers utilize the aforementioned technologies along with other technology to control, cooperate and communicate across multiple and diverse applications.

At the core of the industrial control system, is a logic processor such as a Programmable Logic Controller (PLC). Programmable Logic Controllers are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. These variables can be user-defined and can be defined as bits, bytes, words, integers, floating point numbers, timers, counters and/or other data types to name but a few examples.

Industrial controllers and associated control systems have increasingly become more sophisticated and complicated as control applications have been distributed across the plant floor and in many cases across geographical or physical boundaries. As an example, multiple controllers and/or other devices may communicate and cooperate to control one or more aspects of an overall manufacturing process via a network, whereas other devices may be remotely located, yet still contribute to the same process. In other words, control applications have become less centrally located on a singular control system having associated responsibilities for an entire operation. Thus, distribution of the overall control function and/or process frequently occurs across many control components, systems or devices.

Due to the distributed nature of modern control systems, it has become more difficult to achieve reliable communications and control harmony amongst diverse components that are often only bound via common network connections. Thus, many network components do not operate according to well-coordinated software interactivity even though the network components may communicate via common network protocols such as Ethernet. For example, custom interfaces and/or communications configurations may have to be developed for each control component residing on the network in order for the control components to act in a coordinated manner. As the number of components increase, costly start-up time and development efforts are expended in order to cause the control components to communicate and ultimately cooperate to achieve an overall manufacturing process or outcome. Moreover, given that control systems and associated components are being configured and designed in a more distributed manner, it has become more complicated and time consuming to notify one portion of the control system of occurrences or problems that are happening in other portions of the system.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to facilitate one or more automation services operating in a distributed industrial controller environment, wherein the automation services include a controller data access service and a controller alarm service. A service architecture is provided that includes a set of naming and/or binding conventions along with supporting mechanisms which connect client, server, peer and/or other control components. The service architecture provides a framework of conventions and supporting components that facilitate exposure of the automation services, as supported by server components to one or more client applications (e.g., operating in or in association with an industrial controller). As an example, a Human and Machine Interface (HMI) operating as a client application can send and receive operator or user interface data to a server application associated with a controller via the service architecture. In another example aspect, alarms can be configured in conjunction with a controller, wherein data values are monitored within a predetermined range of operation. If the data values are determined to fall outside of the predetermined range, alarms or events can be triggered and/or fired via the service architecture.

In one aspect of the present invention, the service architecture supports a data access service that provides data from an industrial controller operating according to the service. The controller can operate as a server component, wherein data is provided or generated on a periodic basis, on a requested or commanded basis, and/or provided on a change of state basis. In another aspect of the present invention, the controller or server component provides an alarming service. The alarming service can be configured to monitor data or other input conditions, wherein if the data or input condition falls outside of a predetermined range that is set for the condition, an alarm or an event can be triggered and subsequently transmitted to other control components such as client applications operative in a larger control environment.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology providing automation services in a distributed industrial controller environment. In one aspect of the present invention, a data access service is provided that includes sending and receiving data to and from a data access service namespace operative in the distributed controller environment. The service namespace aggregates a plurality of data item names owned by a plurality of servers associated with industrial controllers into a user-defined access hierarchy. Client components can bind to a location or "area" in this access hierarchy, and employ logical item names to establish physical connections to data items and also receive data updates at a client-specified rate. In another aspect of the present invention, an alarming service is provided wherein data values are monitored in a server component according to predetermined conditions configured by a user or other entity such as an automated monitoring component. If the data values are determined to be outside of boundaries as defined by the predetermined conditions, an alarm can be communicated to a plurality of other components cooperating in the distributed controller environment.

Figure 1:
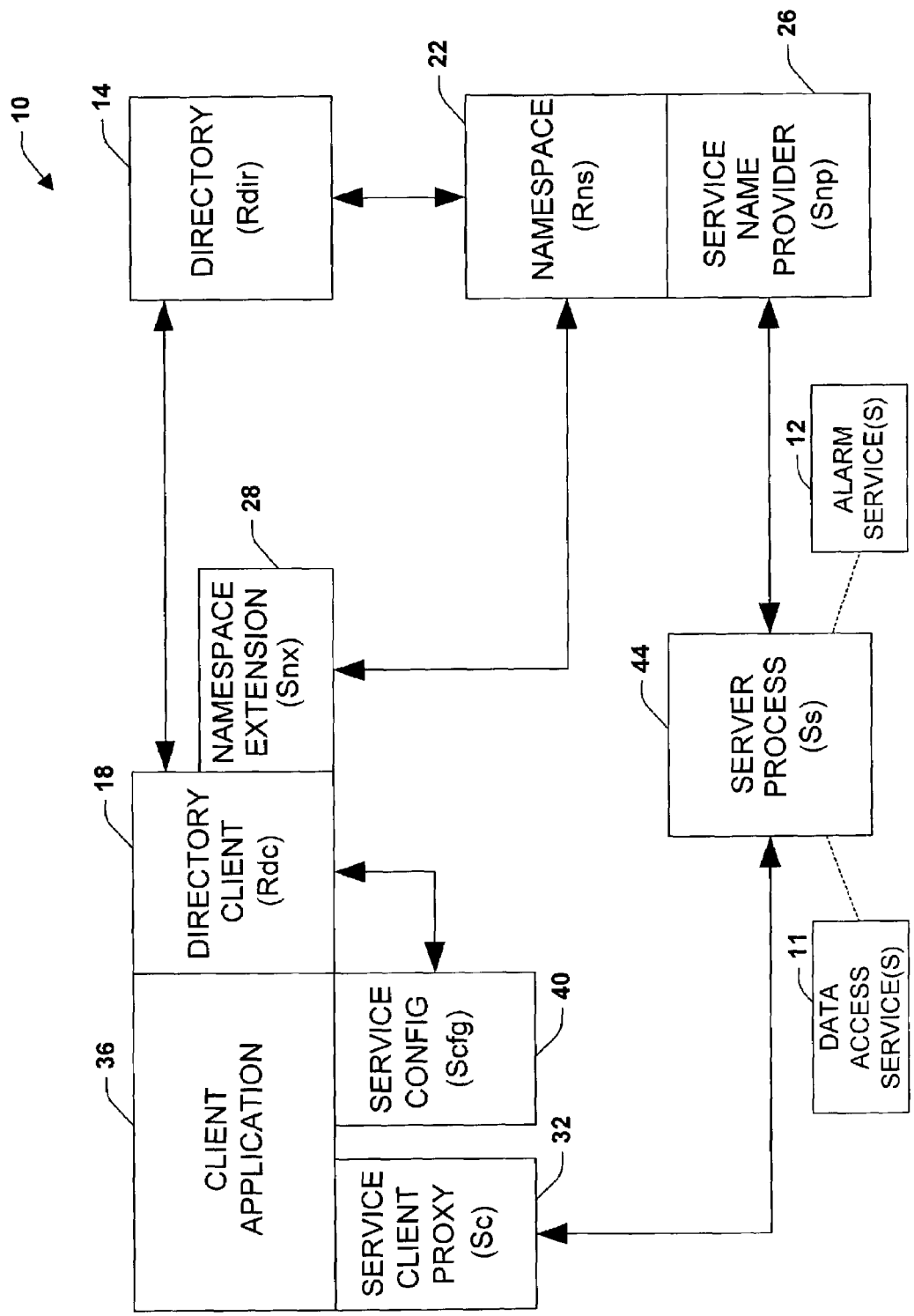
FIG. 1 is a schematic block diagram illustrating a service architecture and automation services in accordance with an aspect of the present invention.

Referring initially to FIG. 1, a schematic block diagram illustrates a service architecture 10 providing data access services 11 and alarm services 12 in accordance with an aspect of the present invention. The service architecture 10 provides an industrial automation model and environment, wherein remote/disparate client and server automation components can interact and cooperate to control an industrial process. The data access services 11 can be associated with a server process on or associated with an industrial controller and facilitate data being sent to and/or received from the controller. The alarm services 12 facilitate monitoring and reporting of data values that operate within specified ranges in accordance with the service architecture 10. The data access and alarm services 11 and 12 respectively will be described in more detail below in relation to FIGS. 2–17. It is noted that nomenclature $R_{XX}$ represents service architecture elements, whereas $S_{XX}$ represents components specific to a service. It is also noted that described component interactions of adjoining components can reside in similar or shared processes. In addition, change notification and redundancy management components can be provided which are not shown.

The service architecture includes a directory 14 ($R_{DIR}$) that provides a persistent store of "globally interesting" or relevant information for one or more control components. The directory 14 includes "Tier" Directory objects which are described below and can include Applications, Areas, and Directory Entries, for example. The scope of the directory 14 may be local to a machine or global to a network, for example. A directory client ($R_{DC}$) 18 (e.g., Active Directory Service Interface (ADSI)) interacts with the directory 14 to provide support for access to directory content. The directory client 18 can include service management interfaces for service binding via directory entries and host basic service and namespace extension components.

A namespace server 22 ($R_{NS}$) is provided that aggregates service item names in areas to provide tier two or higher (tiers described below in FIG. 2) service item namespaces. The namespace server 22 generally expects server-specific components implementing a name provider interface and resolves service item names into server connection data. A name provider 26 ($S_{NP}$) extracts service item names from supporting server processes and exposes internal structure of tier service item names. A namespace extension 28 ($S_{NX}$) exposes service item names via ADSI or other interface and can act as a bridge between tier namespace components.

The service architecture 10 also includes a service client proxy 32 ($S_C$) that provides client-side Application Program Interface (API). In addition, the client proxy 32 can manage multiple servers on behalf of a client application 36. A service configuration 40 ($S_{CFG}$) facilitates creating and editing directory areas and entries to expose services and to define servers. A server process 44 ($S_S$) supports service behavior and exposes the behavior to one or more clients 36 via service-specific interfaces and transport mechanisms accessed via the service architecture 10. Thus, the service architecture 10 incorporates multiple perspectives in a client and server environment including logical, physical, and behavioral aspects. These aspects can be permutations of access, computer and service dimensions of the namespace, for example.

Figure 2:
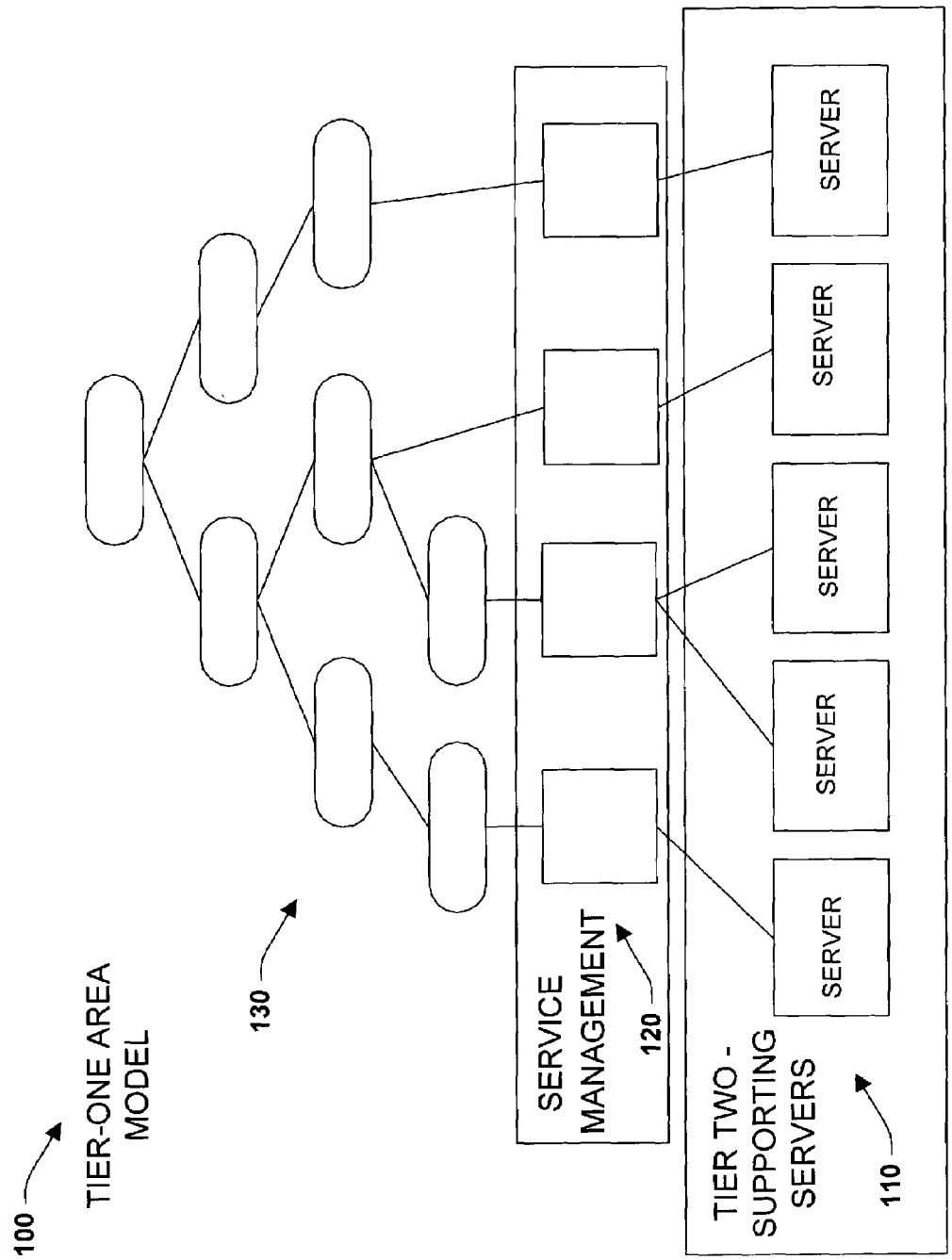
FIG. 2 is a block diagram illustrating a multi-tier architecture in accordance with an aspect of the present invention.

Referring now to FIG. 2, a multi-tiered namespace architecture is provided for constructing a namespace in accordance with an aspect of the present invention. A tree structure 100 organizes access to multiple individual server processes 110 (e.g., five) in multiple (e.g., four) area containers 120. An upper tier 130, can be implemented as a directory system element, and can be structured as a composite tree of containers and directory entries. The containers model includes logical groupings or "areas," wherein an analogy is to physical locations within an installation, the composite tree or "area model" can represent other groupings natural to an automation solution.

A lower tier of the namespace can be formed by aggregating service item names, owned and defined by server software components, within the context of an area 120. This can be achieved via service management behaviors in the directory system element and collaborating service item name management behavior carried out by the namespace server component, described above. Service item names generally are not stored in the directory. Rather, directory entries carry information referencing the server process which supports a given service and hence a set of service names. Service name syntax and definition typically remains the responsibility of the server processes participation in the service. A knowledgeable process (also known as a namespace server) can take this information, contact the referenced server processes, extract service item names from those processes, and aggregate them within the context of an area 120. This forms a service item namespace, organized by the area access hierarchy and accessible to clients via Active Directory Service Interface (ADSI) or other interface component, and possibly accessible via some service-specific interface family.

Service item names are generally required to be unique within an area 120. Thus, name collisions within an area are resolved by pre-pending the service item name with a logical server process name. Beyond names, an entity referenced by a service item name can carry additional properties, properties accessible via ADSI or other interface and possibly a service-specific mechanism. A similar string can appear in different service namespaces as a service item name within a given area 120. This is not prohibited by namespace composition mechanisms, but this usage may be somewhat more difficult in practice.

Figure 3:
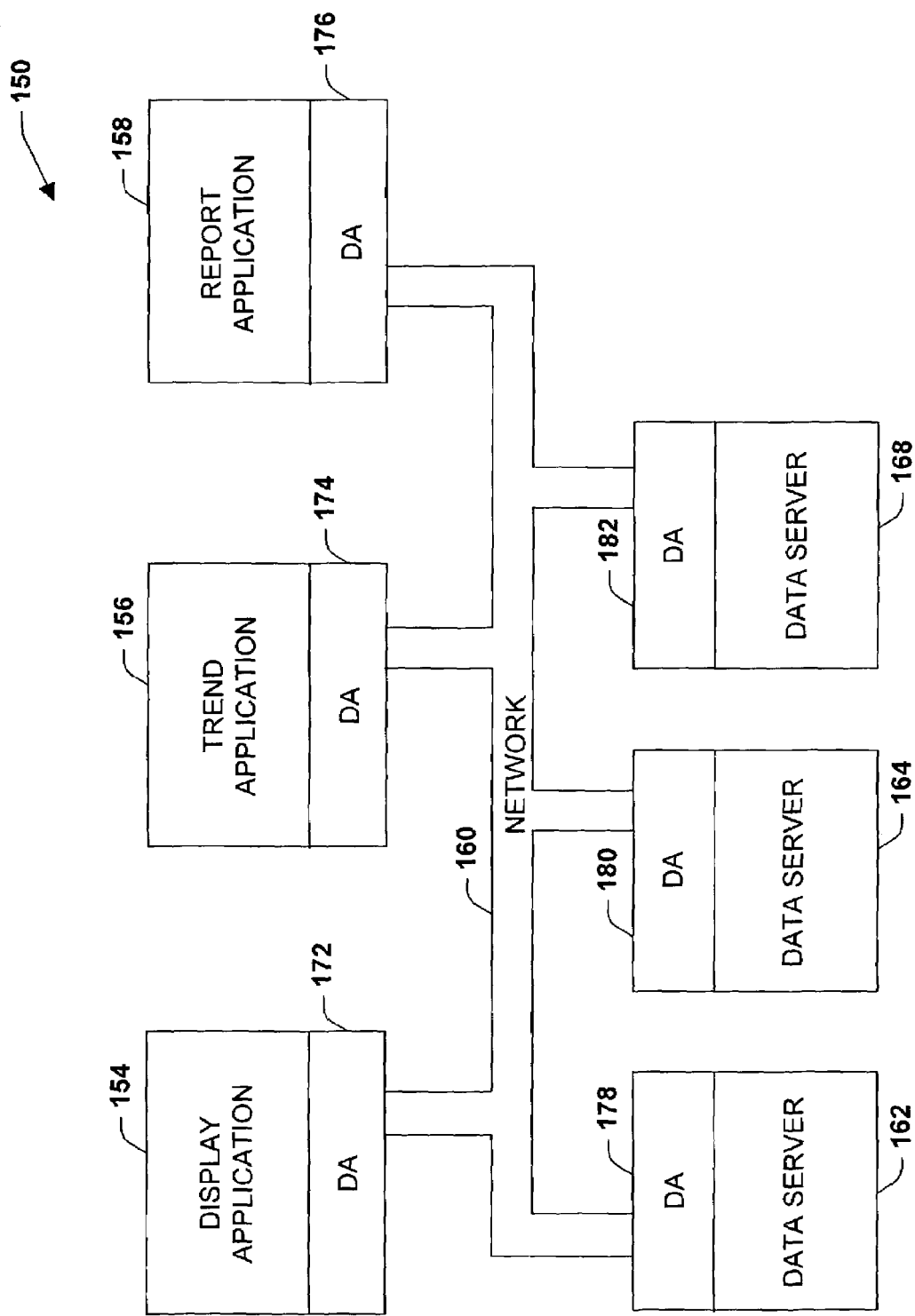
FIG. 3 is a block diagram illustrating an exemplary industrial controller environment in accordance with an aspect of the present invention.

Turning now to FIG. 3, an exemplary data access services system 150 is illustrated in accordance with an aspect of the present invention. The system 150 includes one or more client applications 154 through 158 that communicate via a network 160 to a plurality of data servers 162 through 168. It is noted that the data servers 162–168 are generally associated with an industrial controller. The client applications can include such applications as a display application 154, a trend application 156, and a report application 158. The display application 154 can output data values from the data servers 162–168 to a graphical display screen, whereby status can be provided to an industrial controller operator, for example. The trend application 156 can operate as a monitoring application, wherein data values from controllers are reported to the trend application on a periodic or change of state occurrence of the reported data, whereas the report application 158 can receive data values and generate stored or printed reports based upon a predetermined display or output format for the associated data. It is to be appreciated that a plurality of other client applications 154–158 that access data values in the data servers 162–168 can be similarly provided.

The client and server applications include data access components 172 through 182 to facilitate communications between the respective client and server components. For example, the system 150 illustrates both server-side and client-side data access components 172–182, wherein the components create basic data access behavior in the system 150 and facilitate static configuration and dynamic runtime performance. By exposing data access server instances via the service architecture 10 described above, a data access service namespace can be created by aggregating a plurality of data item names owned by the servers 162 through 168 into a user-defined access hierarchy. Client components 154–158 can bind to a location or "area" in this access hierarchy, and utilize logical item names to establish connections to the data items and also receive data updates at a client-specified rate.

Figure 4:
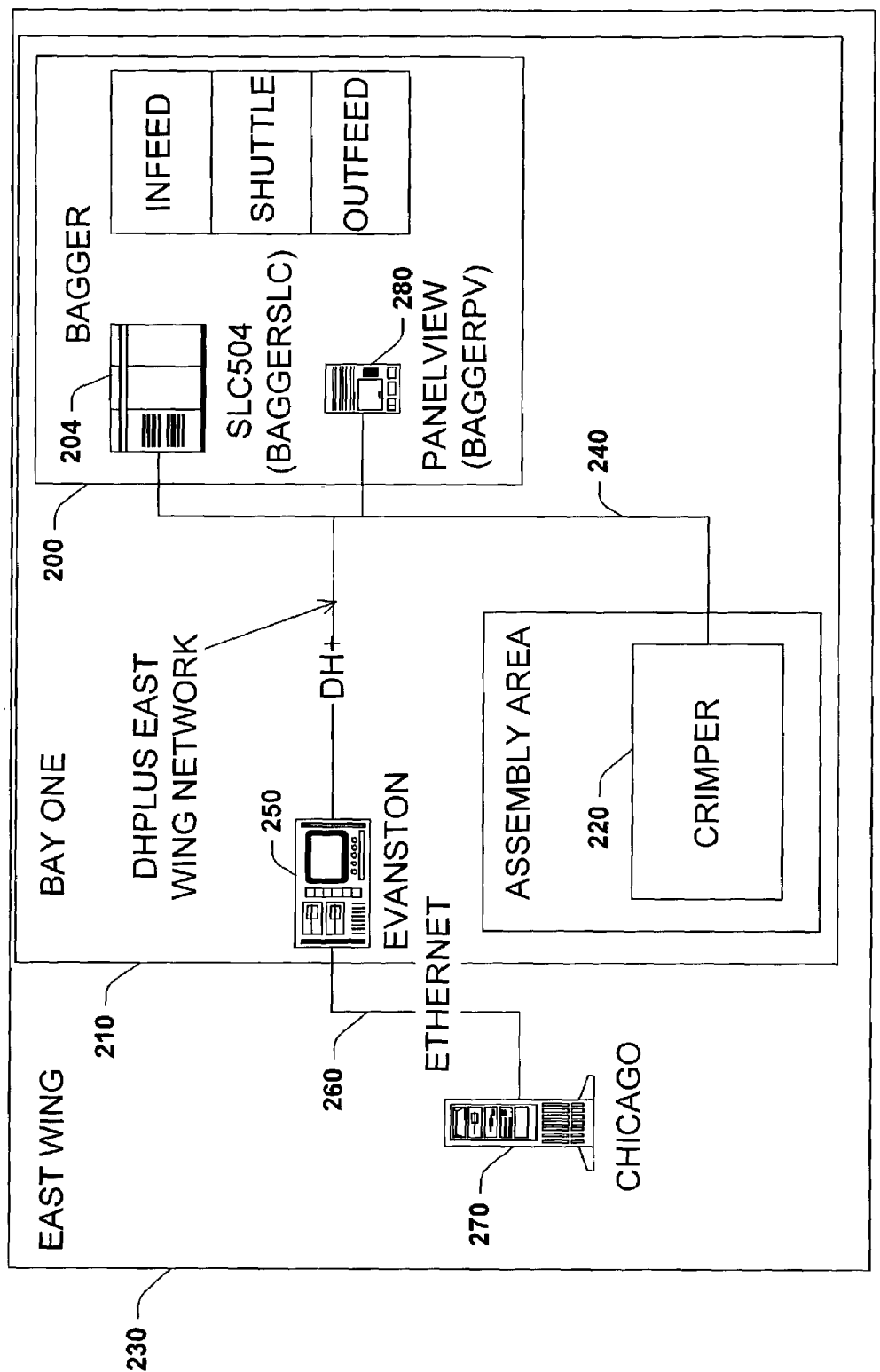
FIG. 4 is a schematic block diagram illustrating an exemplary industrial controller environment in accordance with an aspect of the present invention.

Referring now to FIG. 4, an exemplary namespace is illustrated in accordance with an aspect of the present invention. A relatively straight-forward situation involves a generic piece of manufacturing equipment, for example. An application referred to as a "Bagger" 200 including an industrial controller 204 is placed in a physical situation of industrial control components and associated networks, as illustrated in FIG. 4. It is to be appreciated that the configuration depicted in FIG. 4 is exemplary in nature and a plurality of other configurations are possible in accordance with the present invention.

The machine is located in a physical area called "Bay One" 210, together with a machine called a "Crimper" 220. Bay One 210 can be part of a larger physical space named "East Wing" 230, thus, several other bays could also exist. One or more automation devices can operate the Bagger 200, including a Data Highway Plus (DH+) network or other type network 240 which connects the devices, and a rack mount computer 250 located in Bay One. The DH+ network 240 is known by plant personnel as the "DHPlus East Wing Network", the full extent of this factory automation network is not shown in FIG. 4. The rack mount computer 250 is also a node on an Ethernet network 260 in which the system administrator has chosen to name network machines using place names, thus a large server machine 270 is called Chicago, while the smaller, more focused rack mount computer 250 is called Evanston.

A process on Evanston 250 is referred to as "MfgComms". This process reads data values from the industrial controller 204 operating the Bagger machine 200 over the DH+ network 240. MfgComms can be a data access server, exposing those data items via OLE for Process Control Data Access (OPC-DA) interfaces, for example. A string "$DataItems" identifies the data access service that appears in a namespace extension, which means its service item names appear in the access hierarchy.

Figure 5:
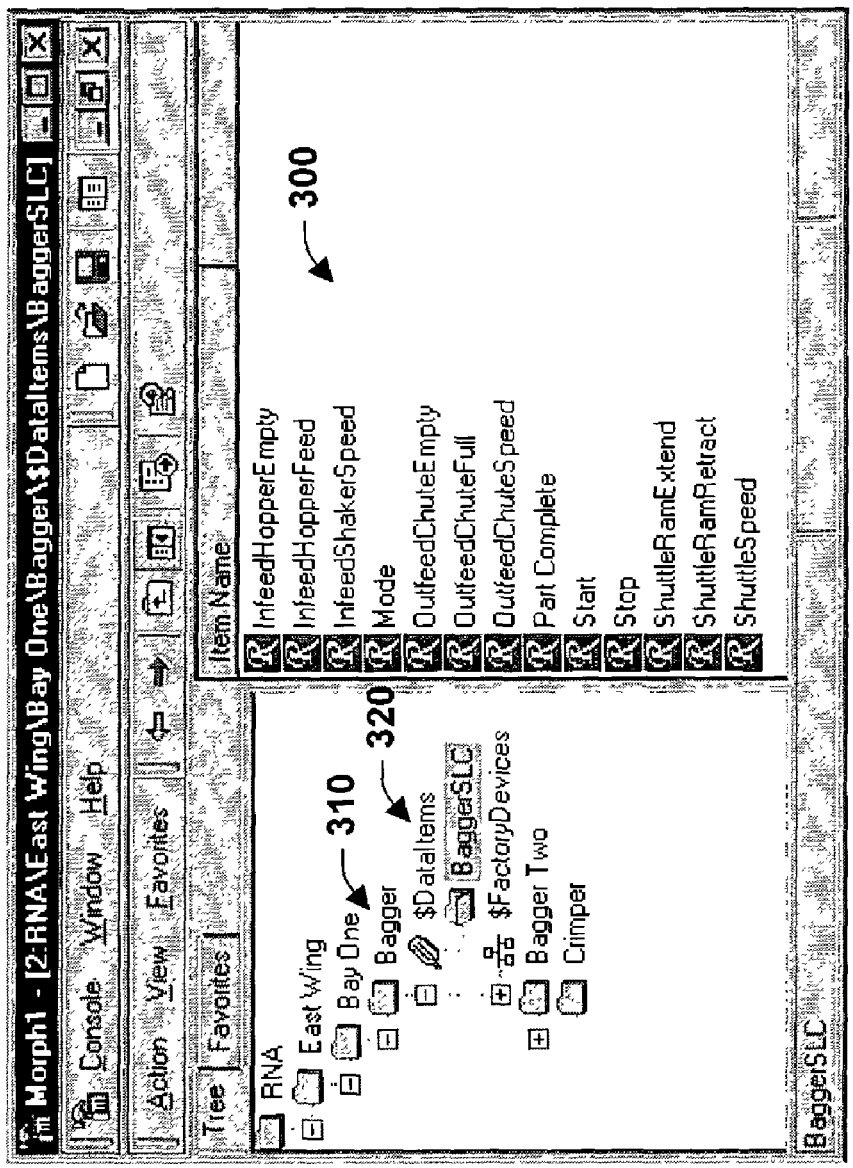
FIG. 5 is a diagram illustrating a server namespace in accordance with an aspect of the present invention.

Assuming a system management tool that can browse service namespaces (e.g., standard browser), an illustration as in FIG. 5 depicts a data access service in this example. Thus, with a single server process supporting the data access service, service item names 300 generally are required to be unique within server boundaries, and the service 310 is exposed in the "Bagger" area of the access hierarchy. Given ADSI or other type interfaces, the directory and namespace server components cooperate to present a navigable namespace of data access service item names as illustrated in FIG. 5, wherein an access hierarchy of areas act as containers. This hierarchy maps to the physical plant floor layout illustrated in FIG. 4. In the left-hand pane of the window depicted in FIG. 5, wherein the data access service is illustrated, Data Items 320 are published in the "Bagger" area 310. Thus, an absolute pathname to this area 310 is "RNA:\\East Wing\Bay One\Bagger". In this particular example, a single server process supports Data Access behavior to be published in this manner. The right hand window pane illustrates the names for the service items 300 available in this "Bagger" directory context.

This information can be exposed to a user in a data access enabled product. The canonical example can be a component which currently acts as an OLE for Process Control (OPC) client, sinking data values from OPC servers. Clients of this sort can become data access client applications by utilizing ADSI and service management interfaces to bind to the data items service in the Bagger area, establishing a "bind context"

and obtaining an IOPCServer interface, and utilize data access service item names, either absolute or relative to the bind context, to establish OPC advise connections.

The data access service namespace of FIG. 5 also illustrates a namespace extension service. The Service Architecture hosts data access components to realize the data access service item namespace shown FIG. 5, and to enable data access clients to obtain and employ a service-specific client-side interface, namely IOPCServer, for example. Subsequent sections below illustrate the Service Architecture and service-specific components. What has been described thus far are data item names supported by the MfgComms process which have been exposed in an access hierarchy of area containers. If additional servers existed in this situation, their names can be aggregated into the data access service item namespace.

In order to issue messaging commands across a factory network like DH+, the MfgComms process employs network addresses and other, possibly device-specific formatting information to form messages for those devices. One way to operate with this is to collect the information into a structure with a human-legible name, and use this name to refer to the physical device. Thus, from the physical layout diagram in FIG. 4, the industrial controller 204 is called "BaggerSLC" and an HMI device 280 is known as "BaggerPV." From the physical diagram, the "DHPlus East Wing Network" 240 is a name for the factory network connecting substantially all the devices in substantially all the bays in the east wing of the plant. The logical names used in the MfgComms process can be similar to the names that identify the physical automation devices.

Since the Service Architecture is extensible, MfgComms or other servers can expose a factory network navigation or "factory topology" service, in which the factory networks and connected devices appear as service items. Further, this topology service can employ a network device form of name structure to identify devices. Again, as in the data access case above, the Service Architecture hosts some service-specific components to support the "$FactoryDevices" service as a namespace extension.

The data access services and associated behaviors described above in FIGS. 1–5 provide a plurality of automation solutions in a distributed control environment. One such solution involves exposing a single, unified data item service namespace in several client products or applications such as in HMI and/or production system domains. The service architecture enables automation designers to create a meaningful logical area hierarchy, publish or expose data access server instances within this hierarchy, and employ logical service item names in various products or components. This can be viewed as one possible form of "data model sharing" that presents an integrated view of an automation solution with respect to data exchange behaviors. Thus, providing a common data access namespace service, common Graphical User Interface (GUI) components can be created, configured and browsed via the service item namespace 300, facilitating the user's investment of time and development efforts.

In addition to the above behaviors, data access services can facilitate management of multiple server connections on behalf of client applications, enabling faster server failure and reconnect behavior. Data access servers and associated services can periodically test the client-server connection and take suitable action in case of server failure or other problem. This type of "server testing" functionality can support a limited form of redundancy support, enabling fail-over behaviors between identically or similarly configured server instances.

Figure 6:
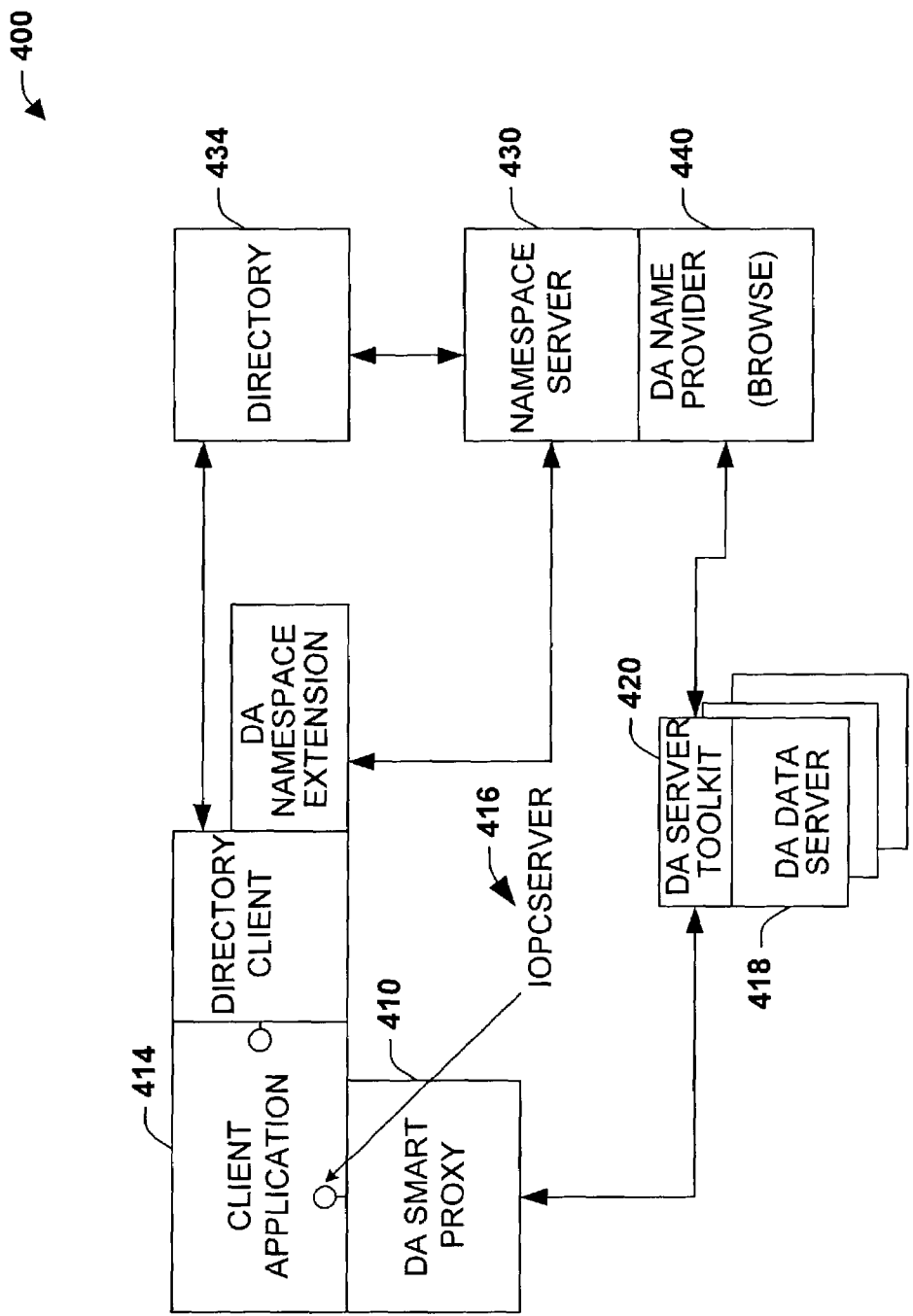
FIG. 6 is a schematic block diagram illustrating a data access service in accordance with an aspect of the present invention.

FIG. 6 illustrates a service architecture 400 providing data access services in accordance with an aspect of the present invention. The system 400 illustrates exemplary data access components 410–440. A client side "smart proxy" component 410 manages multiple data server components on behalf of a client application 414. The client application 414 interacts with an IOPCServer interface 416, for example. A variety of data access compliant servers 418 can be created by packaging data access server-side behavior as a "toolkit" 420 for server authors to support both standalone data access server behaviors, and to facilitate participation in the data access automation service.

Namespace aggregation can be achieved by a namespace server 430 employing a directory 434 to locate server instances in an access hierarchy and provide browse support to extract data item names from server instances in a name provider component 440. Off-line behavior can be accomplished by generally requiring the name provider component 440 to obtain data items from a data file rather than a "live" server instance, for example. It is noted that the name provider component 440 can also be employed to aggregate service items names for other, non-data access services.

Figures 7, 8:
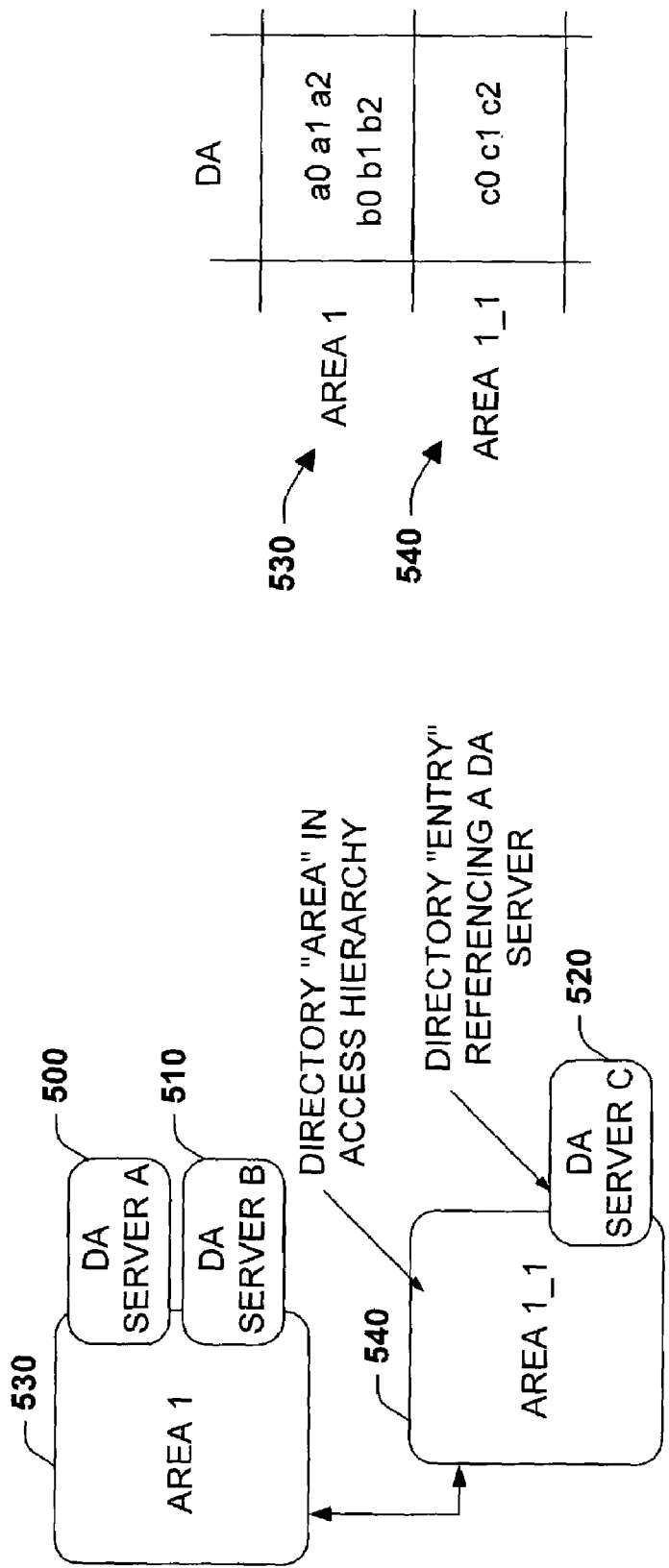
FIG. 7 is a diagram illustrating an access hierarchy in accordance with an aspect of the present invention.
FIG. 8 is a diagram illustrating area contents in accordance with an aspect of the present invention.

FIGS. 7 and 8 illustrate directory server entries and organization of areas in a logical access hierarchy in accordance with an aspect of the present invention. It is noted that the concept of directory described above can be composed of containers and children. One possible form of a child is a directory entry, wherein one possible form of directory entry can carry or provide data access server information. This type of entry can be a data access server entry. A reference to data access server entries can be placed into containers or "areas" in a logical access hierarchy, thus exposing or "publishing" data access servers and is illustrated in FIG. 7. A namespace server 440 can employ this information to contact these server instances, and extract the names of data items supported. For the example in FIG. 7, items a0, a1 and a2 reside in server A at 500, and items b0, b1, and b2 reside in server B at 510, and so forth. The namespace server 440 aggregates these items under area containers 530 and 540, resulting in a data access service namespace which is illustrated in FIG. 8. Additional item properties (max, min, description, and so forth) may also be extracted if supported by the server instance and a possible off-line surrogate.

Client applications can employ service item names to identify individual items and obtain an ADSI or other type object representing that item. For example, item "c2" in server C 520 corresponds to a qualified name as illustrated below in Example 1.

EXAMPLE 1

RNA:\\$Global\Area1\Area1_1\$DataItems::c2

Utilizing the RNA service architecture mechanics, for example, a data access client can execute the following exemplary sequence to obtain an advise connection:

a) Identify a Directory Area to be a bind context
b) Obtain a Container interface on this Area
c) Query the Container interface for a ServiceManagement interface
d) Call ServiceManagement::BindToService, passing a service identifier
e) The result of the BindToService call is a service-specific interface, in this case the type is IOPCServer, implemented by a data access smart proxy
f) Create an item group utilizing the server interface, specifying a data update rate
g) Insert items into a group, employing item names relative to the bind context
h) Activate group to begin data access advise updates Establishing a "live" advise connection with a smart proxy, the client can receive updates via a data access callback interface. The client extracts item data from the data block passed by the smart proxy at respective advise updates. The data access smart proxy utilizes the namespace server to resolve data item names into server connection information, and establishes a connection to the actual source server on behalf of the client application. If the source server is a heritage or third-party OPC server implementation, a Distributed Component Object Model (DCOM) connection can be established, wherein the data access smart proxy organizes and manages actual server connections on behalf of the client application.

In addition to the data access services and associated behaviors described above, other extensions to the services are possible. For example, data exchanges can be optimized for client components residing on a single machine. If multiple clients exist on a single machine, and overlaps in respective advise data exist, a single copy of the data values associated with the respective clients can be communicated to the client machine. Data exchanges can be optimized for client components residing on multiple machines by employing a multicast transport to concurrently send the same data values to multiple clients.

Furthermore, data values can be collected and propagated atomically. For example, if a set or block of data values can be obtained from a factory device in a single read operation, an entire "atomic" block can be communicated to substantially any client accessing any portion of the data block. The block concept mitigates data copies and facilitates a sense of time concurrency with respect to data values in the same block. Related to the "atomic collection" concept is employment of structured or complex data types to describe the content and layout of an atomic data block. Another aspect includes publishing data items to multiple locations or "areas" in an access hierarchy from a single server and/or filtering the data access service namespace for a subset of data item service names from a designated server. Consolidating this filter behavior into "stock" implementations promotes consistent data access browse behavior.

Turning now to FIGS. 9–17, an alarm services architecture is described that can be employed in conjunction with the services architecture described above. Alarm services facilitate automation behavior to perform logical testing on one or more values in a time sequence of values, and can cause an action to be taken based on the results of the test. Alarming as used herein names a set of automation behaviors which signal an operator or other entity such as a machine to take note of a condition, or inform an operator or entity of an aspect of the automation behavior requiring substantially immediate attention. Generally, these conditions can be abnormal or out of bounds to a normal operation as defined by a predetermined range of values.

By contrast, the term event as used herein refers to some detectable occurrence of interest, and may have no direct projection onto a physical automation solution. The notion of an event can be more transitory than an alarm, generally having a "fire and forget" nature (e.g., sending an event to a subsequent system without gaining feedback whether event was received). The alarm services of the present invention include the definition, detection, management and presentation of abnormal or out of range conditions in the automation solution. Abnormal or out of range conditions generally require some attention from a human operator or system.

Alarming services in accordance with the present invention support creation of an extensible, heterogeneous alarm subsystem, and a subsystem that crosses device or product boundaries. Software components can define, subscribe, acknowledge and view alarm definitions and occurrences without processing the burden of alarm detection, alarm occurrence state management or the details of occurrence history storage, display and filtering. However, a form of extensibility can enable alternate forms of alarm occurrence detection.

It is noted that alarm triggers provide logic that detects an abnormal condition, whereas an alarm occurrence, includes a system transition into a region of abnormal or other type operation. In general, an alarming problem domain includes four major topics such as:

A) alarm condition definition to define and create the "trigger logic" which can monitor for abnormal or out of range conditions;
B) alarm occurrence detection to evaluate the alarm trigger logic and create the occurrence upon a true evaluation;
C) alarm occurrence state management, in which the occurrence navigates a state space that may include client notification and acknowledgment of the occurrence; and
D) alarm occurrence history management, in which a trace or time history of alarm occurrences, including state traversal, is maintained for later inspection by clients.

Figure 9:
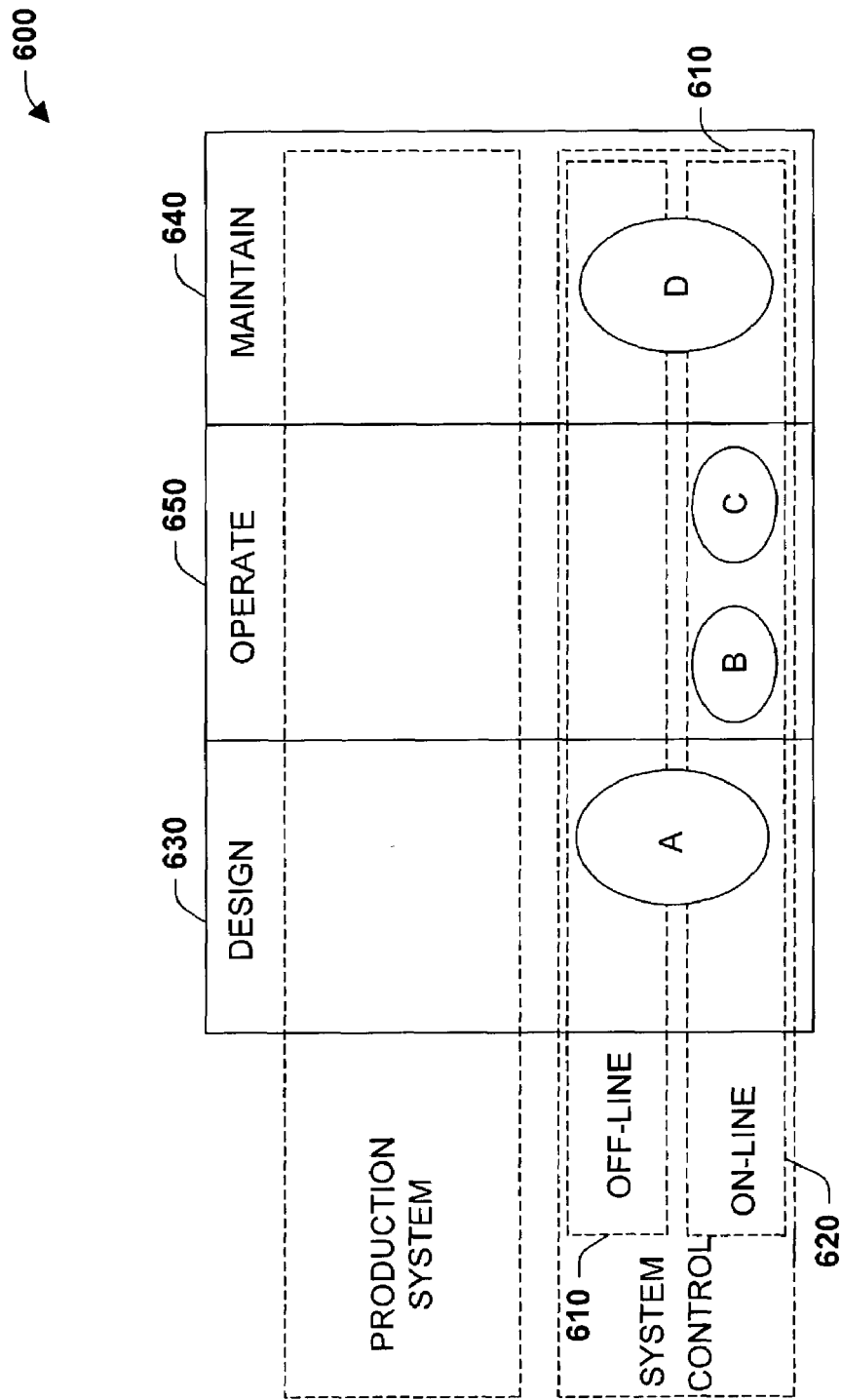
FIG. 9 is a diagram illustrating an alarm environment in accordance with an aspect of the present invention.
Figure 10:
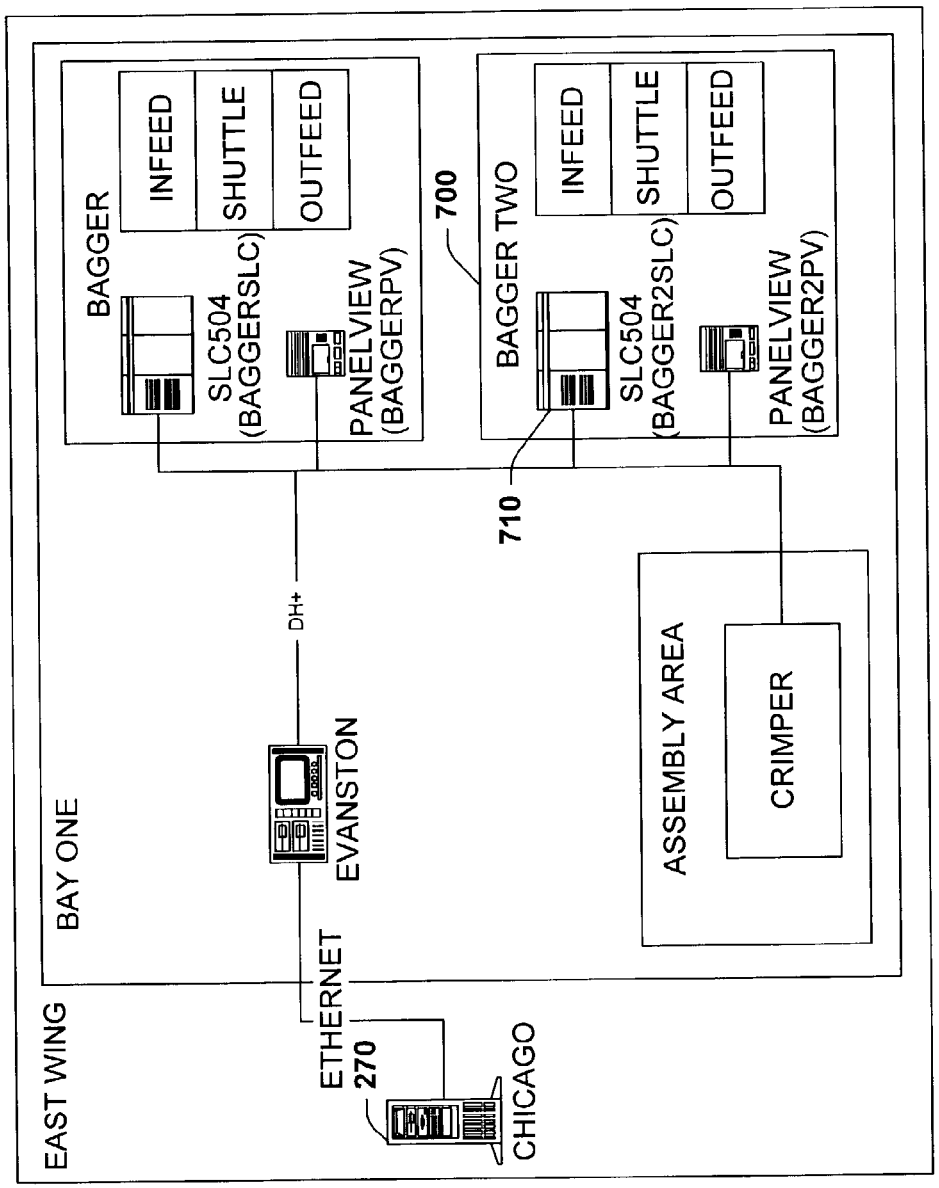
FIG. 10 is a diagram illustrating an exemplary control system in accordance with an aspect of the present invention.
Figure 11:
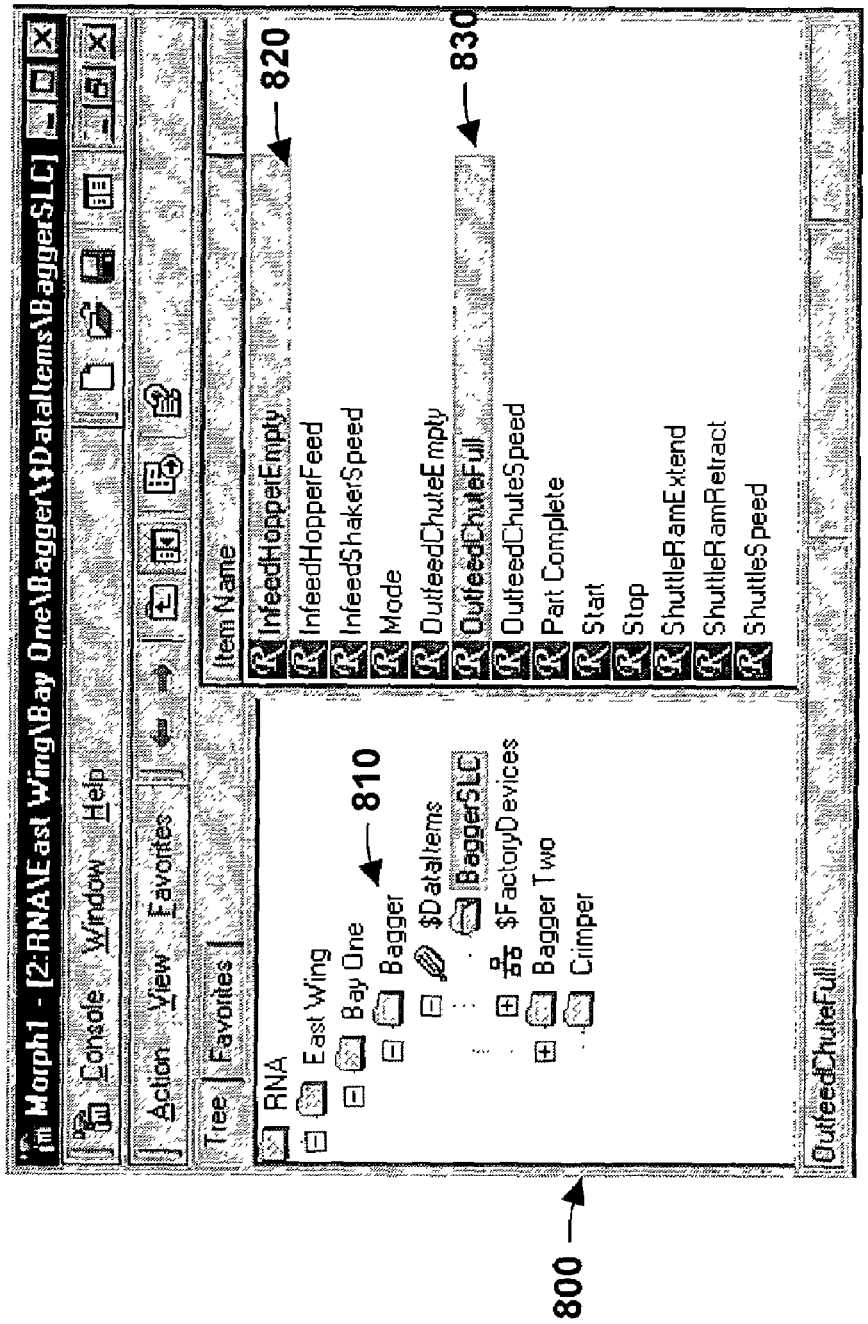
FIG. 11 is a diagram illustrating potential alarm regions in accordance with an aspect of the present invention.

FIG. 9 illustrates the possible alarming behaviors 600 detailed in A through D above. For example, Topic A can include both off-line 610 and on-line 620 definition aspects, primarily in a Design activity, while Topic D has both off-line 610 and on-line aspects 620 in a Maintenance activity 640. Topics C and B, which can be on-line automation service behaviors, are centered in an Operate activity 650. FIGS. 10 and 11 further illustrate alarming services in accordance with the present invention.

FIG. 10 illustrates an alternative and exemplary physical layout in accordance with an aspect of the present invention. In conjunction with introducing a second Bagger machine 700, a change in the configuration of the MfgComms process described above can include data values residing in a Bagger2SLC controller 710. This is reflected in multiple services in a corresponding service namespaces 800, as illustrated in FIG. 11. Two namespace extensions, for example, $DataItems and $FactoryDevices, are exposed in a "Bagger" area 810. An "InfeedHopperEmpty" 820 and "OutfeedChuteFull" data items 830 can be about zero or other value during normal operation of the Bagger machine, whereas a value of one indicates an abnormal or out of range condition. Further, a process referred to as "MfgAlarms" resides on the Chicago server machine 270 illustrated in FIG. 10, wherein this exemplary process supports the alarming service. The MfgComms process on Evanston collects data from the DH+Factory Network, while the MfgAlarms process on Chicago acts as a data access client, performing trigger logic on selected data item values. An alarm publication process can be provided as follows:

1) Select a "base" area of the access hierarchy;
2) Select several Data Access items in that area;
3) Create Alarm triggers which employ those selected Data Access items; and
4) Expose or display those Alarm triggers as service items in the alarm service in the base area.

As alarms can be provided as part of an automation service which employs service item names to interact with its clients, alarms can extend the associated namespace, thus alarm trigger names can appear as service item names under an $Alarms service within a given area access hierarchy container. The typical run-time client behavior is to bind to the alarms service in that access area, and employ alarm interfaces to subscribe to alarm occurrences within that area. For the Bagger example displayed in FIG. 11, a browsing action in the "RNA:\\East Wing\Bay One\Bagger" area in the Service Architecture hierarchy causes a list to appear of the Data Access service item names published in that area. From that list such items can be selected such as the "InfeedHopperEmpty" 820 and "OutfeedChuteFull" items 830.

Figure 12:
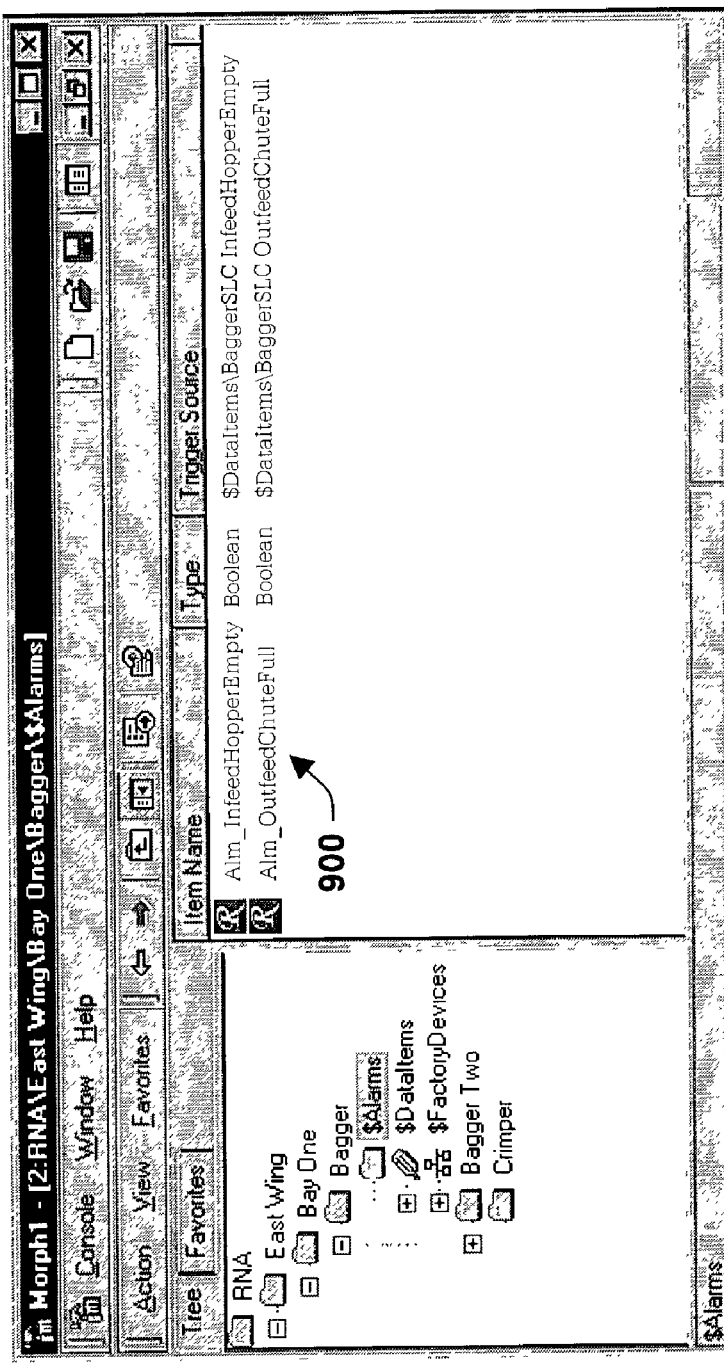
FIG. 12 is a diagram illustrating alarm items in accordance with an aspect of the present invention.

Having these or other selected items 820 and 830, a $Alarm service can be exposed in this same access area, and define a plurality of alarm triggers 900 (e.g., two), driven by the selected Data Access items as illustrated in FIG. 12. For convenience, the triggers have the exemplary prefix "Alm," and can act as Boolean or other type alarm condition flag. By publishing the Alarm service in an area, the set of exposed services and the set of participating processes have been aggregated and cooperate to form an overall control process. A client application, bound by the alarms service in the "RNA:\\East Wing\Bay One\Bagger" area, can subscribe to alarm occurrences in that area. FIG. 12 illustrates two exemplary Alarm triggers 900 in that area. These are the sources for alarm occurrences. The client side interface, (e.g., IOPCEventServer), provides semantics for creating a client subscription and notification path.

Figure 13:
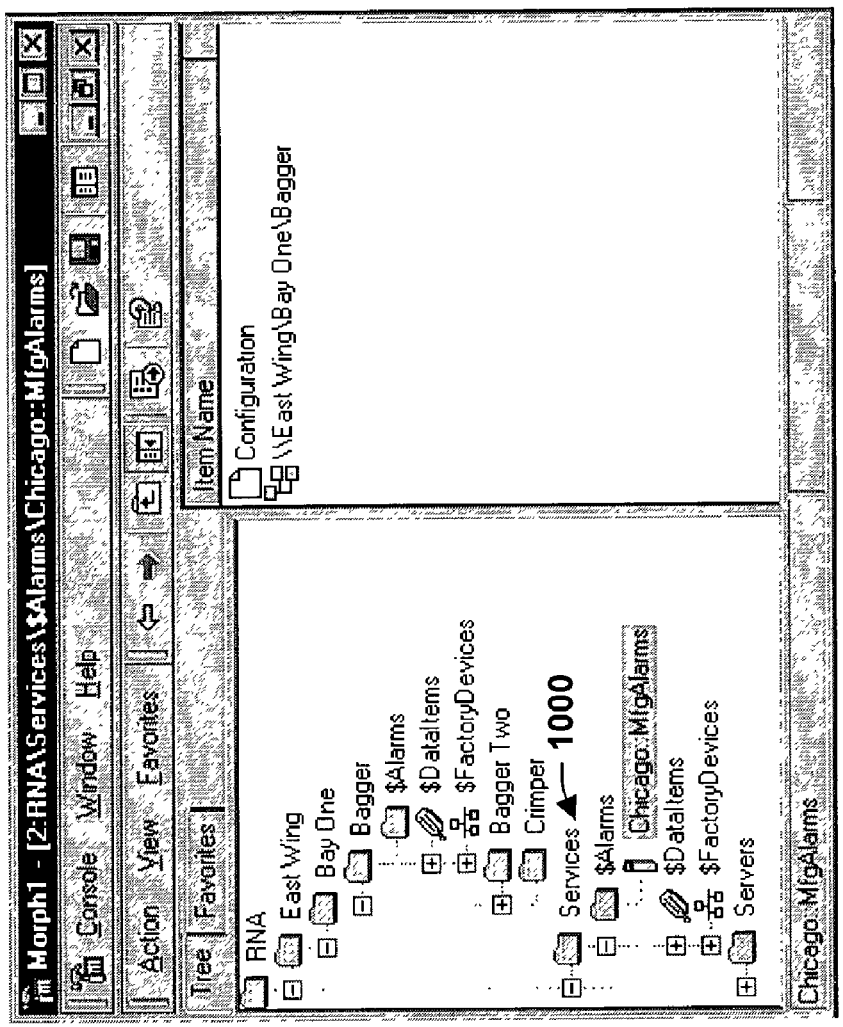
FIG. 13 is a diagram illustrating a services directory in accordance with an aspect of the present invention.
Figure 14:
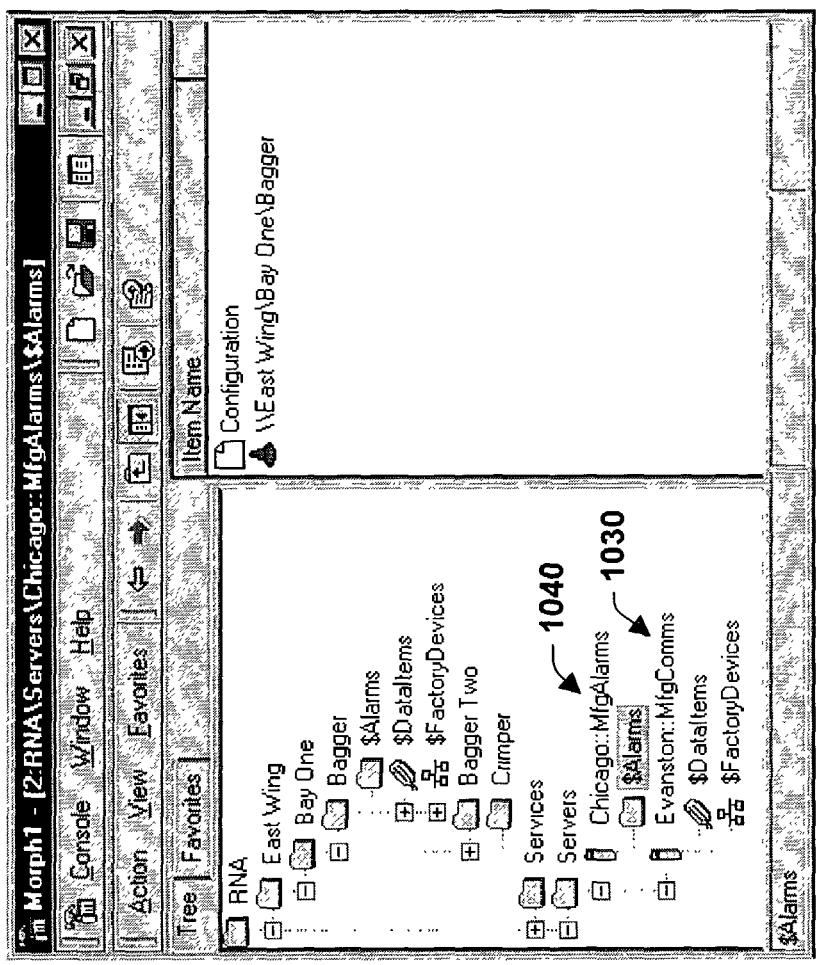
FIG. 14 is a diagram illustrating alarm services associated with a server in accordance with an aspect of the present invention.

A services directory 1000 illustrated in FIG. 13 depicts what services are exposed to clients in which access hierarchy areas. In this example, the alarms services are exposed in a single container of the area access hierarchy, however, other exposure areas are possible. The server directory 1000 gives a list of processes which support different services, together with the physical computers those processes execute upon. As an example, FIG. 14 depicts a MfgComms process appearing on the Evanston machine at 1030, while an MfgAlarms process appears on the Chicago machine at 1040. It is noted that the service architecture described provides several aspects such as an access hierarchy which controls client connections to a desired automation solution behavior exposed by server processes executing on networked computers, controllers or machines.

The alarm services and distributed architecture of the present invention facilitates access to services, and maps physical or logical boundaries of an automation solution into the access hierarchy. Alarming adds an automation service via the access hierarchy established by data access deployment. Another aspect includes client-side define, view, and acknowledge behaviors for alarm occurrences and occurrence history. This behavior can be hosted in different products or within automation software employing the access hierarchy within a given automation solution. Stock alarm condition detection logic can be provided that is closely integrated with the data access service item namespace, employing service item properties available via browse interfaces. An extensible alarm detector interface can also be provided to accommodate alternate alarm condition detection logic strategies including those with a strong analysis or historical component.

Figure 15:
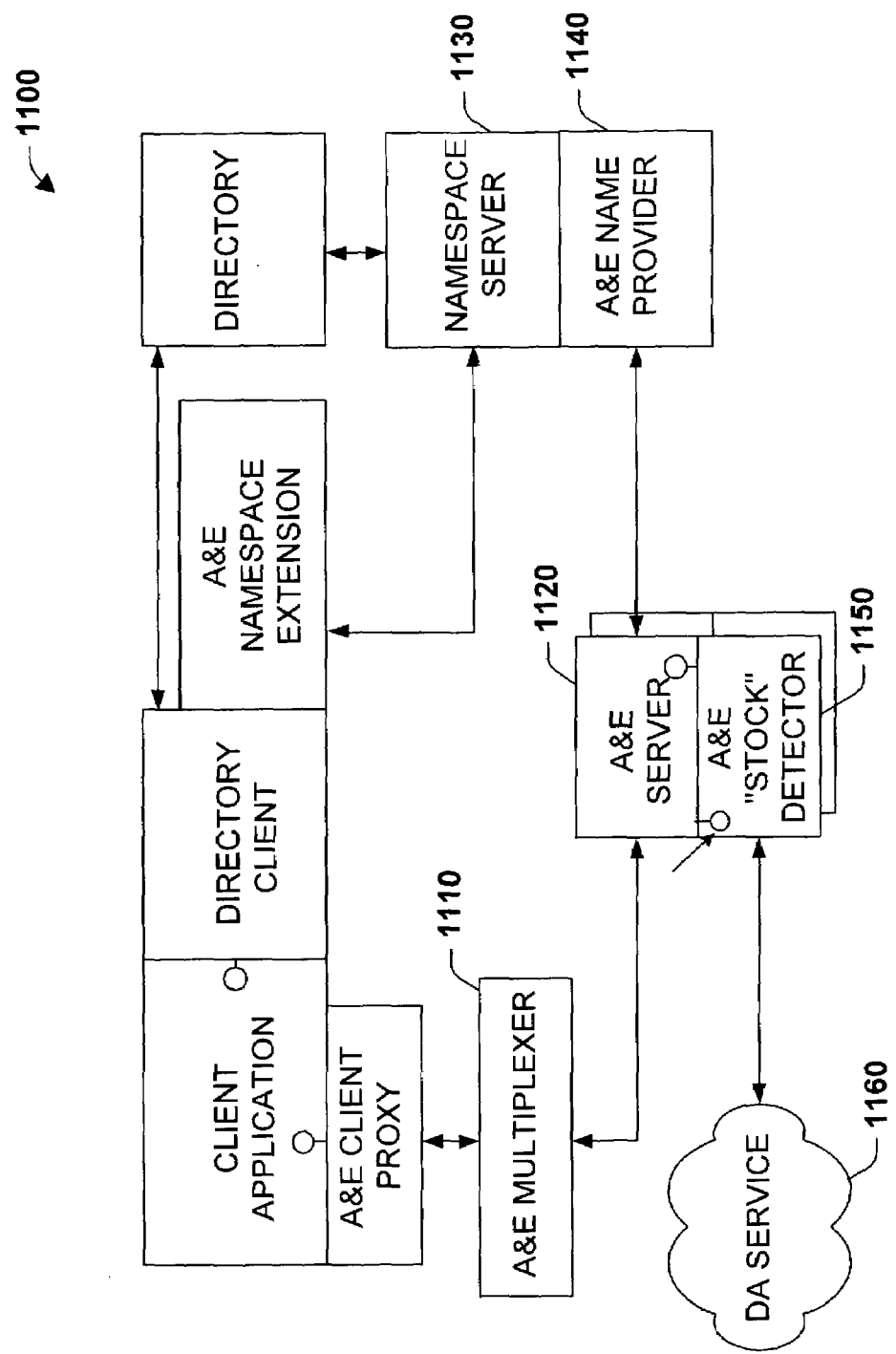
FIG. 15 is a diagram illustrating an alarm services architecture in accordance with an aspect of the present invention.

Referring now to FIG. 15, an alarm services architecture 1100 is illustrated in accordance with the present invention. Multiple alarm and event clients on a computer interact with the alarm service via a multiplexer component 1110, wherein a selected multiplexer interacts with one or more alarm servers 1120 in a given service bind context. An alarm service namespace is exposed via a service-specific namespace extension, which can augment an ADSI interface family. The contents of the service namespace, that is, the names of alarm triggers published by the alarm server 1120 in various access areas, are aggregated on behalf of the client process or application by a namespace server 1130, equipped with an alarm and event specific name provider component 1140. The client access path to the associated service item namespace and associated set of alarm triggers, can employ ADSI to provide a navigable set of access containers or areas, populated by service item names that identify alarm triggers.

The alarm server 1120 encapsulates occurrence management behavior, and isolates a detector 1150 from the details of component interaction. It is noted that the detector 1150 can be employed to monitor data values from a data access service 1160 and described above. Various forms and states can be associated with alarm occurrences and associated triggers. Three state variables can be typically employed to characterize the state of conditions, these variables and allowable values are as follows:

| Enable State | Enabled or Disabled |
| Active State | Active or Inactive |
| Acknowledge State | Acknowledged or Unacknowledged |

According to another aspect of the present invention, an "atomic" collection of informational values can be provided such as in the case of a text message that accompanies an alarm definition. Part of the functionality is to get that message displayed to an operator upon occurrence of an alarm condition, and to retain a record of the occurrence. Another aspect deals with the notion of alarm filtering and grouping. An alarm and event behavior can employ the client's "bind context" to the service to control which subset of alarm servers the client is subscribed to. This is generally represented by an area in the directory access hierarchy. This is useful in that clients generally do not need to establish and manage independent connections to servers. If only a subset of the alarm definitions published in an area are of interest to the client, filtering and grouping of alarm definitions can be provided to enable the client to interact with the desired subset of alarms and/or events.

Filtering can be viewed as selecting a subset of alarm definitions published within an area, wherein sets of alarm definition names are provided, and subscribe to individual alarms by name, rather than substantially all alarms in the area. Sets of alarm definitions leads to a definition of grouping. Grouping creates named sets of alarm definitions, and makes those definitions available to alarm servers.

Yet another aspect includes binding to the alarm service within multiple access areas. An example is selecting a base area, and binding to the alarm service in that base area and child or sub-areas beneath the base area. Furthermore, alarm detector functionality can be provided that is a product of system diagnostic behavior. For example, an alarm based on an analysis of diagnostic log items can be generated and provided as a "diagnostic-aware" alarm detector.

Figure 16:
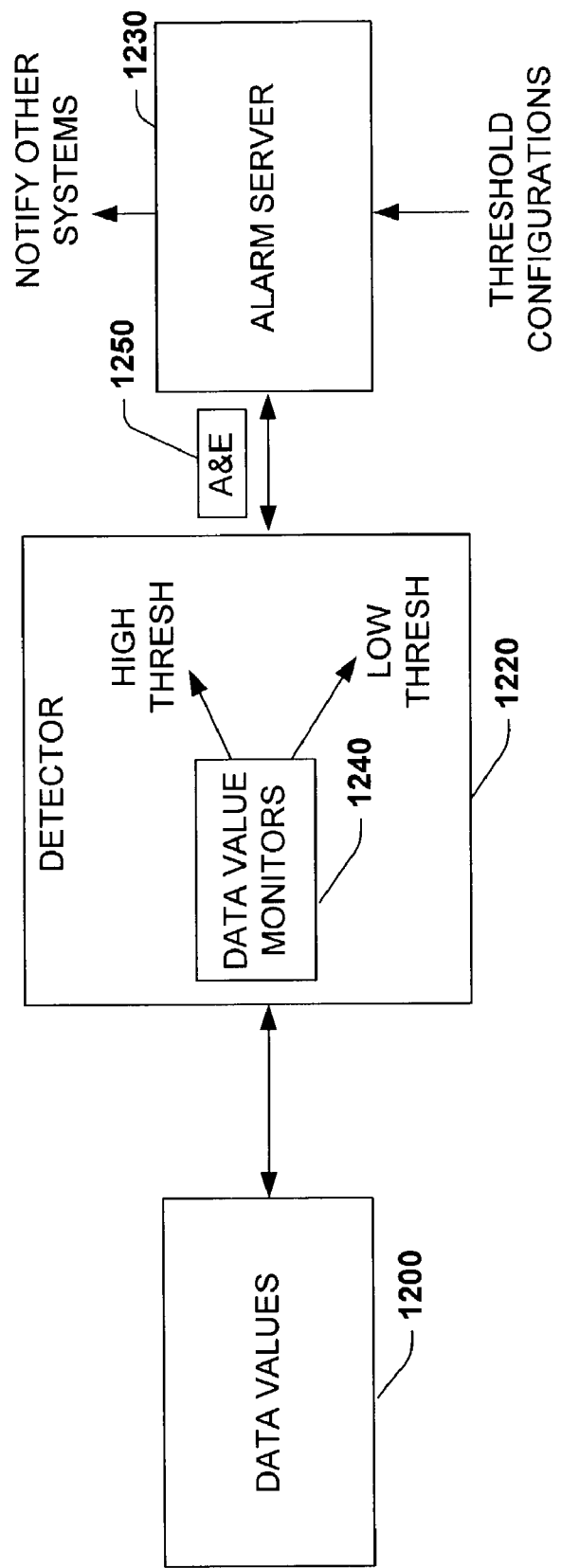
FIG. 16 is a diagram illustrating an alarm detector and server in accordance with an aspect of the present invention.

FIG. 16 illustrates an alarm detector and server as part of a service architecture in accordance with an aspect of the present invention. One or more data values 1200 are monitored via a detector 1220 that interacts with an alarm server 1230. The alarm detector 1220 includes a data value monitor 1240 that can be configured to read or monitor the one or more data values 1200. The configuration can include setting the data values according to predetermined threshold conditions received from the alarm server 1230. For example, a High data threshold and/or a Low data threshold can be provided, wherein the data value monitor 1240 observes or monitors a selected data value 1200 and determines if the data value is operative within a range as defined by the predetermined data thresholds. If the selected data value falls outside of the predetermined thresholds, an alarm or event detect 1250 can be sent to the alarm server 1230, wherein a subsequent client application such as an HMI can be alerted of the alarm or event condition. It is noted that other predetermined thresholds can be monitored. For example, a High/High and/or a Low/Low threshold can be monitored, wherein if a data value 1200 falls within or above these more extreme ranges (greater than the previously described thresholds), the associated alarm detect 1250 can be sent with a higher degree of importance (e.g., flag indicating higher/lower degree of severity). It is to be appreciated that a plurality of alarms having other threshold settings or degrees can be configured to monitor a plurality of different data values 1200. For example, data values can be monitored to facilitate sending alarm/event notifications based on conformance of one or more data values to statistical or mathematical formulae (e.g., rate of change of a data value exceeding a predetermined rate, deviation of a data value from a predetermined norm, and/or other such mathematical tests).

Figure 17:
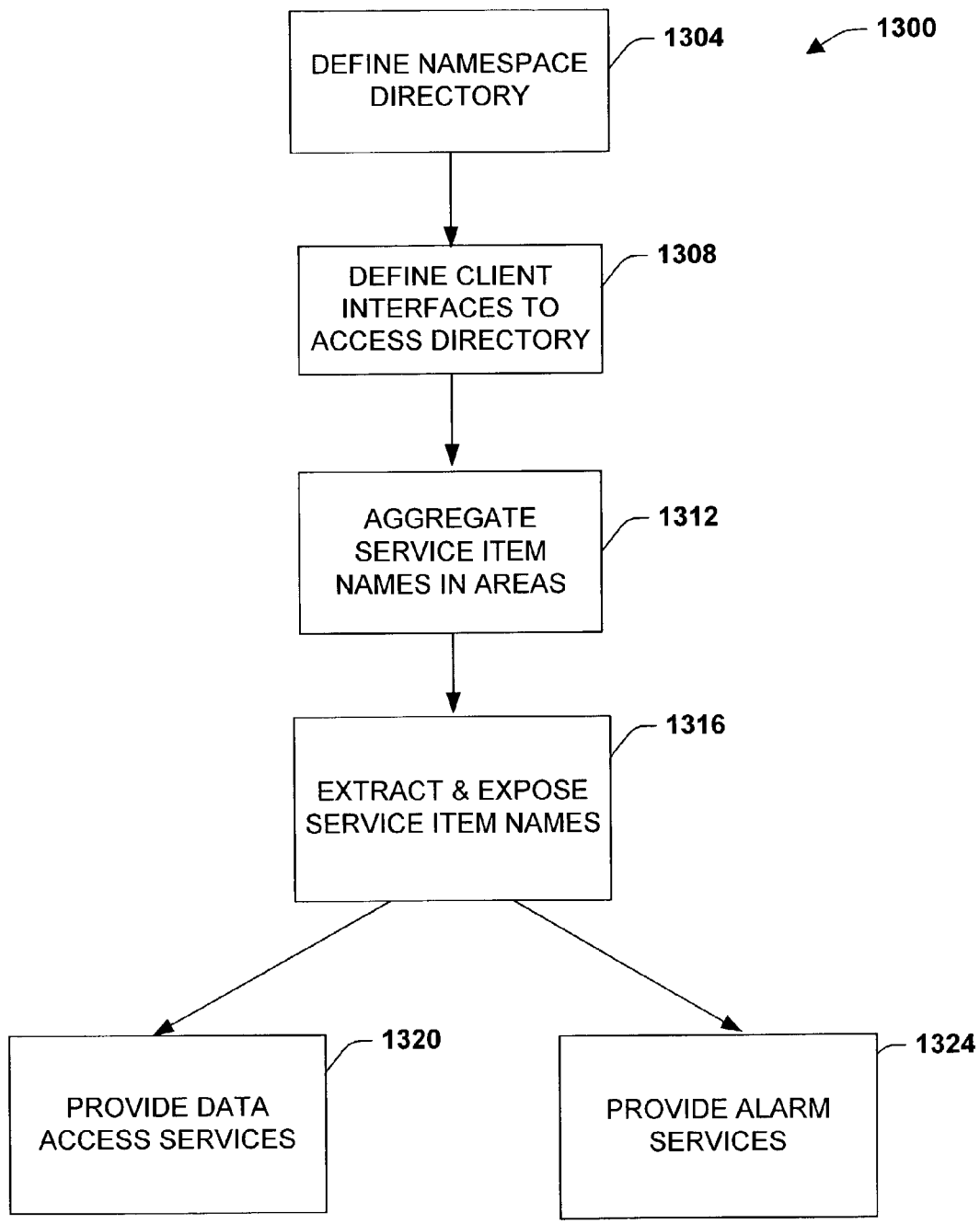
FIG. 17 is a flow diagram illustrating a methodology providing automation services in an industrial controller environment in accordance with an aspect of the present invention.

FIG. 17 illustrates a methodology to facilitate client and server automation services in accordance with the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Turning now to FIG. 17, a flow diagram 1300 illustrates an industrial control and interactive process for automation services in accordance with an aspect of the present invention. Proceeding to 1304, a namespace directory is defined. The namespace directory can include directory objects that can be mapped into areas, applications, directory entries, and/or other designations if desired. At 1308, client interfaces are defined that provide access to the namespace directory. As described above, an ADSI interface can be employed, although the present invention is not limited to such interfaces. At 1312, service item names are aggregated into one or more areas in order to provide a multi-tier namespace architecture. At 1316, the aggregated service item names are extracted from supporting server processes and exposed according to the interfaces defined at 1308. At 1320, data access services are provided. This can include sending and receiving data to and from one or more industrial controllers or devises operative as servers via the exposed service items names. In addition, multiple client applications can be configured to access the data from the controllers. At 1324, alarm services are provided. This can include monitoring data values on an industrial controller according to predetermined operating ranges for the data values. If the data values happen to fall outside of the predetermined range, an alarm or event can be triggered and sent to a client application or applications operating in conjunction with the controller.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An industrial control system, comprising:
  a namespace component that aggregates a plurality of service names associated with one or more automation services into one or more areas, the service names associated with a plurality of logical names and respective logical server process names to ensure name uniqueness within an area, the automation services interact with an industrial controller and include at least one of a data access service and an alarm service, wherein the data access service comprises a client component that at least one of binds to a location in an access hierarchy, utilizes logical item names to establish connections to data items and receives data at a client-specified rate; and
  an interface component that accesses the namespace component via at least one of the plurality of logical names in order to facilitate execution of the automation services.

2. The system of claim 1, the interface component and the namespace component operate on the same server.

3. The system of claim 1, the interface component and the namespace component operate on a client and a server.

4. The system of claim 3, the client is at least one of Human and Machine Interface application, a display application a trend application, and a report application.

5. The system of claim 1, the data access service further comprising data access components that create data access behavior and facilitate at least one of static configuration and runtime performance.

6. The system of claim 1, the data access service further comprising at least one of management of multiple server connections on behalf of client applications, periodically testing connections between client and servers, and enabling fail-over behaviors in similarly configured server instances.

7. The system of claim 1, the data access service further comprising at least one of a namespace server to locate server instances in an access hierarchy and provide browse support to extract data item names, and a name provider component to support off-line behavior by obtaining data items from a data file.

8. The system of claim 1, the data access service establishes an advise connection to receive updates via a data access callback interface.

9. The system of claim 1, the data access service sending a single copy of data to multiple clients operating on a single machine and employing a multicast of the data to multiple clients operating on separate machines.

10. The system of claim 1, the data access service communicating data values atomically in a block to facilitate time concurrency with respect to data values in the same block.

11. The system of claim 1, the data access service publishes data items to multiple locations in an access hierarchy and filters the hierarchy for a subset of the data items.

12. The system of claim 1, the alarm service facilitate automation behavior to perform logical testing on one or more data values in a time sequence of values and cause an action to be taken based on results of the test.

13. The system of claim 12, the alarm service notifying an entity based on a determination derived from the logical testing that the one or more data values fall outside of a predetermined range.

14. The system of claim 13, the predetermined range further comprising at least one of a high, low, high/high, and a low/low threshold.

15. The system of claim 12, further comprising sending at least one of an alarm and an event based upon at least one of a logical testing on the one or more data values and conformance of the one or more data values to statistical formulae or mathematical formulae, the formulae including at least one of a rate of change of a data value exceeding a predetermined rate, a deviation of a data value from a predetermined norm, and other mathematical tests.

16. The system of claim 13, the alarm service further comprising at least one of an alarm condition definition to define and create trigger logic which can monitor for out of range conditions; an alarm occurrence detection to evaluate the alarm trigger logic and create an occurrence upon a true evaluation; an alarm occurrence state manager in which the occurrence navigates a state space that includes client notification and acknowledgment of the occurrence; and an alarm occurrence history manager in which a time history of alarm occurrences is maintained for later inspection.

17. The system of claim 1, the alarm service further comprising at least one of on-line behavior, off-line behavior, design activity, maintenance activity, and operations activity.

18. The system of claim 1, the alarm service are associated with a service item namespace.

19. The system of claim 1, the alarm service further comprising a multiplexing component to interact with a plurality of alarm servers.

20. The system of claim 1, the alarm service including at least one of an enable state, an active state, and an acknowledge state.

21. The system of claim 1, the alarm service providing a message that is associated with the alarm.

22. The system of claim 1, the alarm service providing a filtering aspect to select a subset of alarms that are published within an area.

23. The system of claim 1, the alarm service including an alarm based on an analysis of diagnostic log items.

24. A method to facilitate data access with an industrial controller, comprising:
identifying a directory area to bind a context;
creating an item group specifying a data update rate;
inserting items into the group relative to the bind context; and
activating the group to begin data access with the industrial controller.

25. The method of claim 24, further comprising obtaining a container interface on the directory area.

26. The method of claim 25, further comprising querying the container interface for a service management interface.

27. The method of claim 26, further comprising at least one of binding to the service management interface and passing a service identifier.

28. The method of claim 27, further comprising receiving a result from the service via a data access proxy.

29. A method to facilitate alarm services with an industrial controller, comprising:
selecting a base area of an access hierarchy;
selecting one or more data access items in the base area;
creating alarm triggers that employ the selected data items based at least in part on an analysis of a diagnostic log relating to the selected data items; and
exposing the alarm triggers as service items to one or more client applications.

30. The method of claim 29, further comprising at least one of binding alarm services in an access area and employing alarm interfaces to subscribe to alarm occurrences in the area.

31. The method of claim 30, further comprising publishing the alarm services in the area to form an overall control process.

32. The method of claim 29, further comprising providing semantics for creating a client subscription and notification path.

33. The method of claim 29, further comprising providing an alarm condition flag as part of the alarm triggers.

34. An industrial control system, comprising:
a namespace component that aggregates a plurality of service names into one or more areas, the plurality of service names accessible by at least one Human and Machine Interface (HMI) and one or more servers, the service names associated with a plurality of logical names and respective logical server process names to ensure name uniqueness within an area, the servers interact with at least one industrial controller and provide at least one automation service, the at least one automation service includes at least one of a data access service and an alarm service, wherein the data access service comprises a client component that at least one of binds to a location in an access hierarchy, utilizes logical item names to establish connections to data items and receives data at a client-specified rate; and
an interface component that accesses the namespace component via at least one of the plurality of logical names in order to facilitate operations between the at least one automation service and the HMI.

* * * * *